Nov. 7, 1939.  E. D. DAVIS  2,178,933
PHOTOGRAPHIC METHOD AND APPARATUS
Filed March 16, 1938
Fig. 1.
Fig. 2.
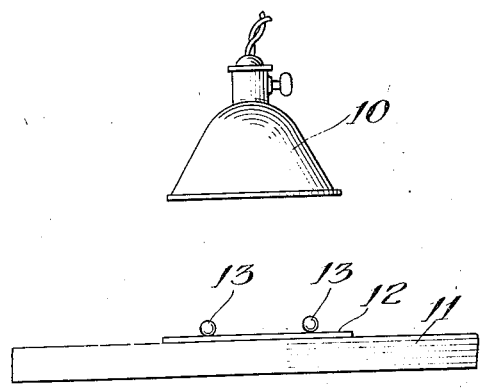
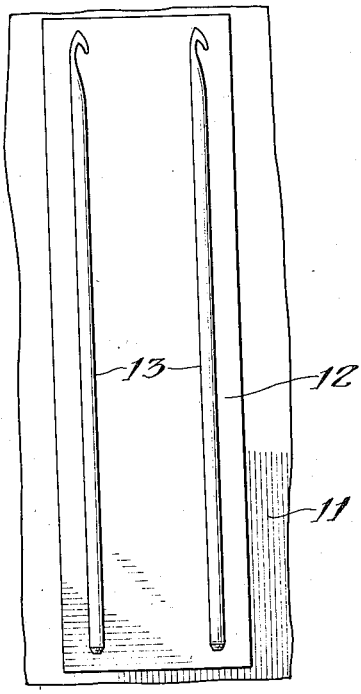
Fig. 3.
Fig. 4.
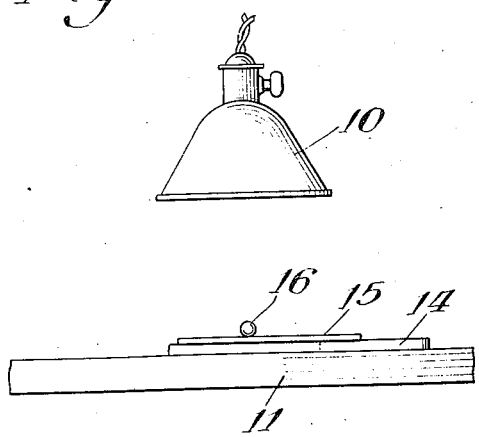
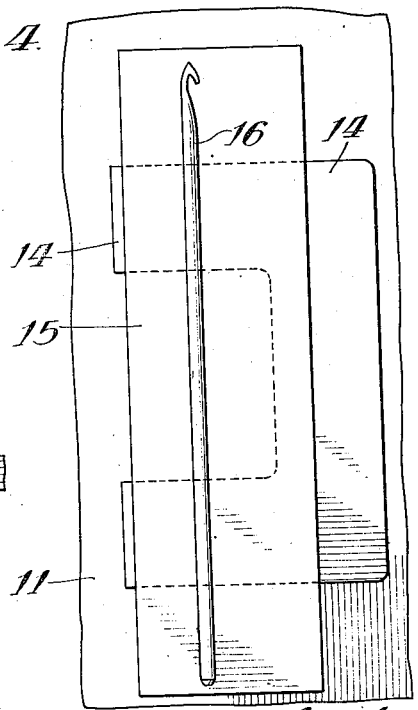
Inventor:
Edward D. Davis,
By Chritton, Wiles, Davies, Hirsch & Dawson
Attorneys Patented Nov. 7, 1939

2,178,933

UNITED STATES PATENT OFFICE 2,178,933

PHOTOGRAPHIC METHOD AND APPARATUS

Edward D. Davis, Chicago, Ill., assignor to The Boye Needle Company, Chicago, Ill., a corporation of Illinois Application March 16, 1938, Serial No. 196,271

1 Claim. (Cl. 95—5)

This invention relates to a photographic method and apparatus.

An object of the invention is to provide an extremely simple method and means for making an accurate photograph or profile record of an object. A further object is to provide simple means whereby metal parts of extremely small size, etc., can be readily retained in a desired position for the making of a photograph. Other specific objects and advantages will appear as the specification proceeds.

The invention is illustrated, in preferred embodiments, by the accompanying drawing, in which—

Figure 1 is a side elevational view of apparatus through the use of which my new method may be employed; Fig. 2, a plan view of the support and photographic plate; Fig. 3, a view similar to Fig. 1 but showing a modified form of the invention; and Fig. 4, a plan view of the support and apparatus carried thereby shown in Fig. 3.

In the illustration given in Figs. 1 and 2, 10 designates an ordinary electric lamp reflector for directing rays from the light bulb therein downwardly. 11 designates a support of any suitable type. 12 designates a sensitized film or plate of any suitable type which will be designated hereinafter as a photographic plate. 13 designates articles to be photographed which, in this instance, are crochet hooks.

In the structure shown in Figs. 3 and 4, the support 11 carries immediately thereon a flat magnet 14. The photographic plate 15 rests upon the magnet and the object 16 to be photographed, which, in this instance, is a crochet hook and rests upon the photographic plate 15.

In the practice heretofore of making commercial reproductions of objects, where it is desired to obtain an extremely accurate and non-diffusing outline of the object, it has been the practice to make such reproductions through the use of cameras using the best lenses available. However, the slight imperfections of the lenses and the photographic equipment used result in a slightly diffused or imperfect reproduction of the outline of the object. The imperfections are further magnified in the forming of printing surfaces for reproducing the objects on trade folders, etc.

Further, in the reproduction of extremely delicate objects, such as table cloths, etc., it is practically impossible, by camera, to obtain a perfect showing of the individual threads.

I have discovered that by eliminating the photographic apparatus, such as cameras and the use of lenses, etc., while following a direct method of the type which I shall now describe, a perfect reproduction of the outline of the article is accomplished.

In the practice of my method, I place the photographic plate 12 upon any suitable support 11, and upon the plate is placed the object to be photographed, all of this being done in a dark room. In this instance, the objects are crochet hooks. The hooks and plate are arranged directly below a light source, such as, for example, a light bulb with a reflector, the arrangement being such that the light rays during the brief exposure will be directed downwardly in a substantially straight line so as to form a shadow upon the plate 12, with the shadow being of the same dimensions and outline as the article to be photographed. After the very brief exposure, the photographic plate or sheet 12 is developed in the usual way. The shadow reproduction of the original object is found to be identical with the outline of the object, even to the most minute degree.

In the handling of a number of metal objects, and particularly small objects, such as needles, etc., it is extremely difficult to arrange them in the proper position upon the photographic sheet. However, through the use of a flat magnet 14, I find that the needles can be manipulated easily and turned so as to form exactly the grouping desired.

The method is particularly useful in forming accurate reproductions of articles where sharp demarcation must be made between spaces and along delicate and crossing lines. In the forming of cloth patterns, reproductions of structures having delicate and interlocking lines, and structures having sharp points and minute spaces between parts, the method is extremely effective. If desired, there may be combined with the object to be reproduced, a pattern of any desired shape or design, such as, for example, cross-lines forming a graph design, etc.

The method is extremely simple and inexpensive. The exposure of a large number of articles can be made in a very short time and with accurate results. From the negative, copies can be made for printing in catalogues so as to give much more faithful reproductions of the objects than have heretofore been made through the use of expensive photographic equipment and more complicated procedures.

The foregoing detailed description has been given for clearness of understanding only, and no unnecessary limitations should be understood therefrom, but the appended claim should be construed as broadly as permissible in view of the prior art.

I claim:

In a method of the character set forth for the photographic reproduction of a metal object, the steps of supporting a flat magnetized metal body below a light source in a dark room, placing a flat light-sensitive sheet upon said magnetized body so that the sheet lies in contact therewith, directing light from the source perpendicularly to the light-sensitive sheet, placing said metal article to be reproduced upon said sheet whereby the same is maintained in the desired position by said supporting flat magnetized body, briefly exposing said sheet to light rays from said source whereby the only shadow formed upon said sheet is one coterminous with said metal object, and developing said sheet.

EDWARD D. DAVIS.